United States Patent [19]

Sawyer et al.

[11] Patent Number: 5,752,162
[45] Date of Patent: May 12, 1998

[54] METHODS FOR ASSIGNING SUBSCRIBER UNITS TO VISITED GATEWAYS

[75] Inventors: Steven Paul Sawyer, Fountain Hills; Peter Joseph Armbruster, Tempe; Steven Harry Moritz, Phoenix, all of Ariz.

[73] Assignee: Motorola, Inc., Schaumburg, Ill.

[21] Appl. No.: 552,424

[22] Filed: Nov. 3, 1995

[51] Int. Cl.⁶ .................................................. H04B 7/185
[52] U.S. Cl. .......................... 455/13.1; 455/428; 455/450
[58] Field of Search .................................. 455/12.1, 13.1, 455/31.1, 54.1, 54.2, 56.1, 422, 427, 428, 429, 430, 450, 452, 453, 455; 379/58, 59; 370/316

[56] References Cited

U.S. PATENT DOCUMENTS 5,561,836 10/1996 Sowles et al. .......................... 455/12.1

*Primary Examiner*—Reinhard J. Eisenzopf
*Assistant Examiner*—Thanh Le
*Attorney, Agent, or Firm*—Harold C. McGurk

[57] ABSTRACT

Methods (100) assign a subscriber unit (30) to be served by a gateway (40) based on such factors as the location of the subscriber unit (30), whether the call is to be intercepted and whether the serving gateway (40) is capable of servicing the connection request. The method (100) does not drop a call because the visited gateway initially assigned by the home gateway (40) is unable to service the connection request; but instead routes the call around disabled or congested gateways to an alternate visited gateway that is capable of servicing the connection request.

24 Claims, 2 Drawing Sheets

METHODS FOR ASSIGNING SUBSCRIBER UNITS TO VISITED GATEWAYS

TECHNICAL FIELD

This invention relates generally to mobile telecommunication systems and, in particular, to methods for assigning subscriber units to visited gateways.

BACKGROUND OF THE INVENTION

When a subscriber unit requests service in conventional space-based or terrestrial telecommunication systems, the method for assigning the subscriber unit to a gateway is typically based on which gateway is the closest to the subscriber unit. For a subscriber unit close to a border, the subscriber unit may be assigned to a gateway which is on the other side of a border, rather than to a gateway in the country in which the subscriber unit is currently located. Moreover, the subscriber unit may be assigned to a gateway which is down, overloaded or incapable of handling the call, and in which case, the call may be dropped.

Another problem in conventional methods for assigning subscriber units to gateways occurs when the subscriber unit's communication is to be intercepted. In most systems, subscriber traffic can only be intercepted at the gateway which is providing service to the subscriber unit. However, the information about which calls are to be intercepted usually reside in a gateway which is expected to provide service to the subscriber. Thus, if the subscriber unit is located in another country which contains another gateway, and the other gateway is not capable of intercepting the subscriber unit's call, the call would not be intercepted if the subscriber unit was assigned to this other gateway. In addition, the system would not know that the call was to be intercepted because it did not consult the subscriber unit's home gateway for the intercept status of the call.

Thus, there is a significant need for methods that assign a subscriber unit to a gateway that can best service it. There is also a significant need for a method that assigns a specific subscriber unit to a serving gateway based on whether the call is to be intercepted or whether the call is to be routed around disabled or congested gateways.

In addition, there is significant need for a method that assigns subscriber units that would have been dropped due to gateway congestion or failure to an alternate home or visited gateway.

DESCRIPTION OF THE PREFERRED EMBODIMENTS

The present invention has utility in that a home gateway assigns a subscriber unit to a visited (i.e., serving) gateway to service the subscriber unit's connection request and call. Moreover, the present invention allows a subscriber unit to be served by a gateway other than the gateway which is geographically closest based on factors such as whether the call is to be intercepted, for example.

A "satellite" as used throughout this description means a manmade object or vehicle intended to orbit the earth. A "satellite" comprises geostationary, low-earth and medium-earth orbiting satellites and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial or space-based telecommunication systems and/or combinations thereof.

Figure 1:
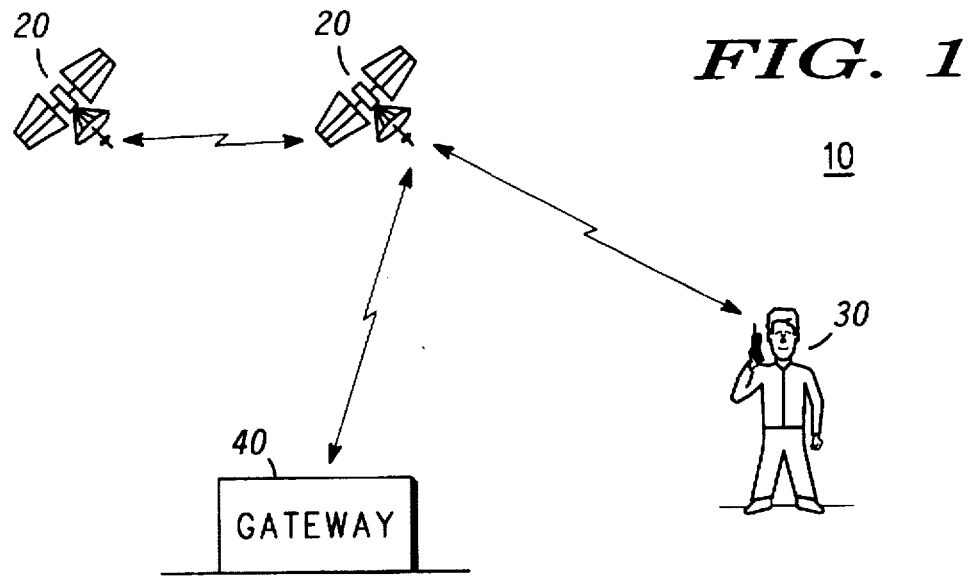
FIG. 1 shows a general view of a space-based mobile telecommunication system according to a preferred embodiment of the present invention.

FIG. 1 shows a general view of space-based telecommunication system 10 according to a preferred embodiment of the present invention. Although FIG. 1 illustrates a highly simplified diagram of mobile telecommunication system 10, system 10 comprises at least one satellite 20, any number of subscriber units 30 and at least two gateways 40. Generally, telecommunication system 10 may be viewed as a network of nodes. All nodes of communication system 10 are or may be in data communication with other nodes of communication system 10 through communication links. In addition, all nodes of telecommunication system 10 are or may be in data communication with other telephonic devices dispersed throughout the world through public service telephone networks (PSTNs) and/or conventional terrestrial communication devices coupled to a PSTN through conventional terrestrial base stations.

The present invention is applicable to space-based telecommunication systems that assign particular regions on the earth to specific cells on the earth, and preferably to systems that move cells across the surface of the earth. Although the present invention is applicable to space-based telecommunication systems 10 having at least one satellite 20 in low-earth, medium-earth or geosynchronous orbit, satellite 20, is preferably in low-earth orbit around earth. Satellite 20 may be a single satellite or one of many satellites in a constellation of satellites orbiting earth. The present invention is also applicable to space-based telecommunication systems 10 having satellites 20 which orbit earth at any angle of inclination including polar, equatorial, inclined or other orbital patterns. The present invention is applicable to systems 10 where full coverage of the earth is not achieved (i.e., where there are "holes" in the telecommunication coverage provided by the constellation) and to systems 10 where plural coverage of portions of the earth occur (i.e., more than one satellite is in view of a particular point on the earth's surface).

Each satellite 20 communicates with other nearby satellites 20 through cross-links. These cross-links form a backbone of space-based mobile telecommunication system 10. Thus, a call or communication from one subscriber unit located at any point on or near the surface of the earth may be routed through a satellite or a constellation of satellites to within range of substantially any other point on the surface of the earth. A communication may be routed down to a subscriber unit (which is receiving the call) on or near the surface of the earth from another satellite 20. How satellite 20 physically communicates (e.g., spread spectrum technology) with subscriber units 30 and gateway 40 is well known to those of ordinary skill in the art.

Subscriber units 30 may be located anywhere on the surface of earth or in the atmosphere above earth. Mobile telecommunication system 10 may accommodate any number of subscriber units 30. Subscriber units 30 are preferably communication devices capable of receiving voice and/or data from satellites 20 and/or gateway 40. By way of example, subscriber units 30 may be hand-held, mobile satellite cellular telephones adapted to transmit to and receive transmissions from satellites 20 and/or gateway 40. Moreover, subscriber units 30 may be computers capable of sending email messages, video transmitters or facsimile machines just to name a few.

How subscriber units 30 physically transmit voice and/or data to and receive voice and/or data from satellites 20 is well known to those of ordinary skill in the art. In the preferred embodiment of the present invention, subscriber units 30 communicate with satellite 20 using a limited portion of the electromagnetic spectrum that is divided into numerous channels. The channels are preferably combinations of L-Band, K-Band and/or S-band frequency channels but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Gateway 40 communicates with and controls satellite 20. There may be multiple gateways 40 located at different regions on the earth. For example, there may be one gateway 40 located in Honolulu, another located in Los Angeles and another in Washington, D.C. Another example is to have separate gateways 40 located in each country on the earth. Gateways 40 may provide satellite control commands to satellite 20 so that satellite 20 maintains its proper position in its orbit and performs other essential house-keeping tasks. Gateways 40 may be additionally responsible for receiving voice and/or data from satellite 20. How gateway 40 physically communicates (e.g., spread spectrum) with satellites 20 and/or subscriber units 30 is well known to those of ordinary skill in the art.

A "gateway" 40 as referred to throughout this description includes home gateways, visited gateways, alternate home gateways, alternate visited gateway, ground stations, ground control stations, base stations, earth terminals or any other term representing a facility that determines which satellite or base station should service a particular subscriber unit.

Figure 2:
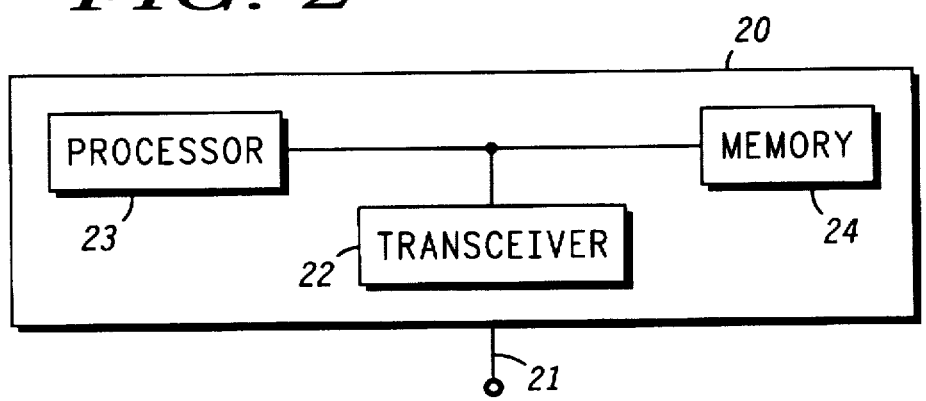
FIG. 2 shows a general view of the components of a satellite, home and visited gateways according to preferred embodiment of the present invention.

FIG. 2 shows a general view of the components of satellite 20 and/or gateway 40 according to a preferred embodiment of the present invention. For purposes of this description, reference will be made to satellite 20, although most of the components are similar to those in gateway 40. Satellite 20 comprises at least the following components: antenna 21, transceiver 22, processor 23 and memory 24. There may be other components of satellite 20 that are not shown which are necessary for operating a satellite but are not important to the present invention. These other components are well known to those of ordinary skill in the art, including for example, solar arrays and fuel propulsion system in satellites 20, or switches and network routers in gateways 40. Moreover, there may be more than one of the components in satellite 20, such as multiple processors 23, for example.

Antenna 21 of satellite 20 is coupled to transceiver 22, while transceiver 22, processor 23 and memory 24 are inter-coupled to each other. Transceiver 22 is able to transmit or receive data or voice, and may be for example, a modem. Transceiver 22 is also capable of receiving data from subscriber units 30 and/or gateway 40. Processor 23, via a software program controls the operation of satellite 20 and the other components of satellite 20. Memory 24 stores part of the software executable version of method 100 (described below) and other software programs. Antenna 21, transceiver 22, processor 23 and memory 24 are all well known to those of ordinary skill in the art.

Figure 3:
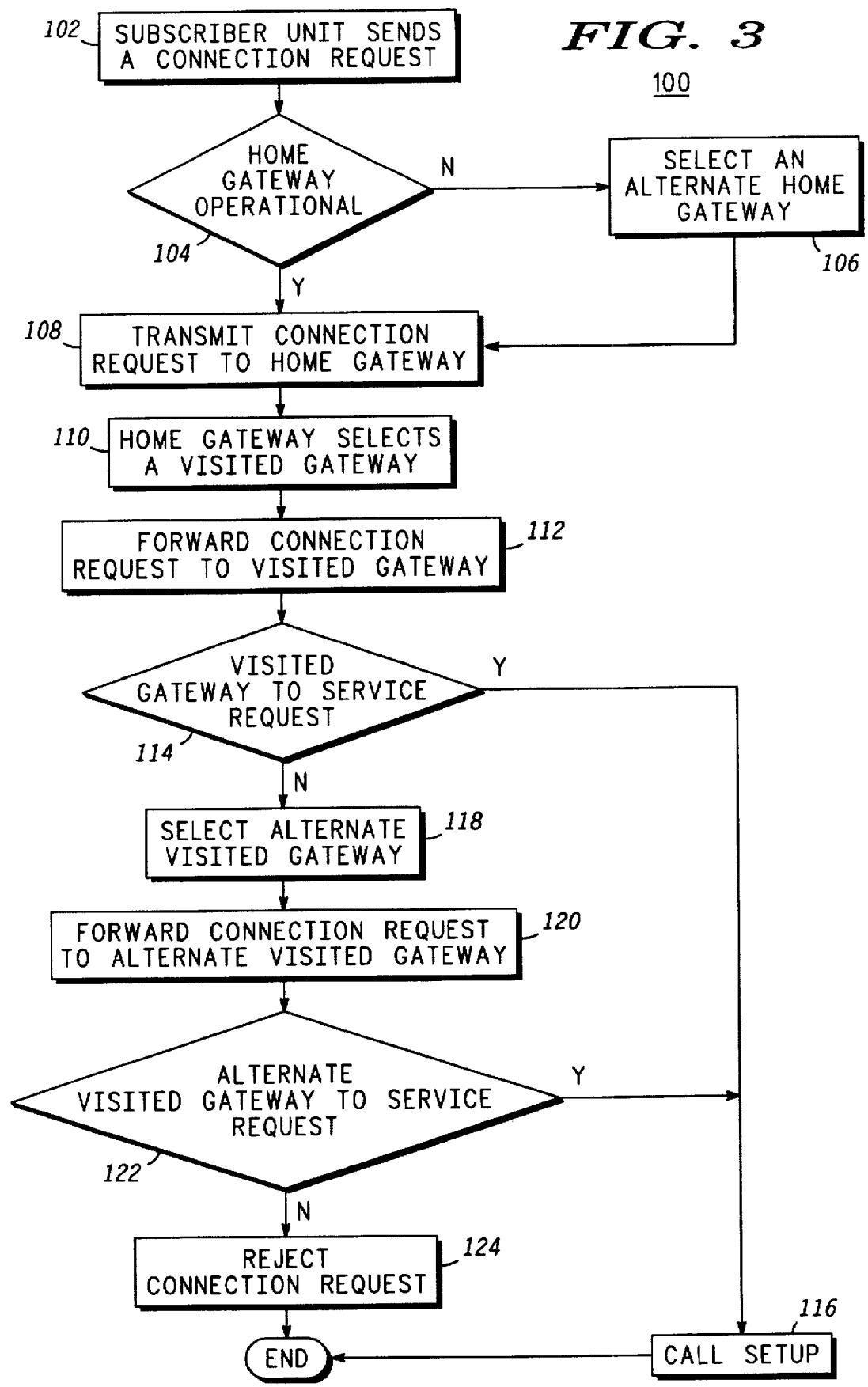
FIG. 3 shows a flowchart of a method for assigning a subscriber unit to a visited gateway according to a preferred embodiment of the present invention.

FIG. 3 shows a flowchart of method 100 for assigning subscriber units to visited gateways according to a preferred embodiment of the present invention. Method 100 is a software program that is executed by a number of network components (e.g., currently serving satellite, home gateway, alternate home gateway (if needed), visited gateway and alternate visited gateway (if needed)) in the preferred embodiment. The network components may execute other software programs as well.

Method 100 begins in step 102 when a subscriber unit accesses the network 10 and sends a connection request to a satellite currently serving it. The connection request includes information about the subscriber unit, including for example, a location of the subscriber unit on earth, a home gateway identification (ID) and a priority of the call, such as whether the call is an emergency call.

The currently serving satellite determines in step 104 whether the home gateway is capable of handling the connection request. The determination is based on whether the home gateway is down, overloaded or some other factor that makes it incapable of handling the connection request. The status of each gateway, including the home gateway, is stored in each satellite and is periodically updated in one or more satellites whenever the status of a gateway changes.

If the home gateway is incapable of servicing the connection request, the currently serving satellite determines in step 106 which alternate home gateway will service the connection request. The currently serving satellite chooses an alternate home gateway from an alternate list of home gateways. It is preferred that there be at least one alternate home gateway for each home gateway. However, in alternative embodiments, there may be no alternate home gateways due to political considerations or nationalist concerns, for example; however, the number of home gateways may be equal to the total number of gateways in the system. In the preferred embodiment, the currently serving satellite selects an alternate home gateway based on which alternate home gateway is the next best choice in the list of alternate home gateways. The next best choice is based on whether the alternate home gateway has the capability to handle the call. If the currently serving satellite knows that the alternate home gateway is also incapable of servicing the connection request for any reason, the currently serving satellite may choose another alternate home gateway from the list of alternate home gateways.

In the preferred embodiment, an alternate home gateway will be chosen in step 106. However, in an alternative embodiment, if an alternate home gateway is not chosen (because no other gateway can handle the request), method 100 skips to step 124 and rejects the connection request. This step may involve sending a message to the subscriber unit that indicates to the subscriber unit that the connection request is rejected.

If an alternate home gateway is chosen by the currently serving satellite, the alternate home gateway ID is substituted for the original home gateway ID in the connection request. The currently serving satellite and the other satellites in the network use the home gateway ID contained in the connection request to route the connection request to the subscriber unit's home gateway.

If the home gateway is capable of handling the connection request as determined in step 104 or an alternative home gateway is selected in step 106, the currently serving satellite adds its own ID to the connection request and forwards or routes in step 108 the revised connection request to the home gateway. If the currently serving satellite is directly coupled to the home gateway, the satellite routes the information down to the home gateway. Otherwise, the connection request has to be routed through the network of satellites. As described above, the satellites are interconnected to each other by cross-links. A table or other data structure resides in each satellite so that the connection request can be routed from the currently serving satellite through other intermediary satellites if needed, and finally to the satellite that is directly servicing the home gateway.

According to FIG. 3, after the home gateway receives the connection request in step 108, the home gateway selects in step 110 a serving gateway from a list of gateways that are capable of servicing the connection request. The gateway selected to be the serving gateway may be the home gateway or may be another gateway. If the gateway selected to be the serving gateway is not the home gateway, it is referred to as a visited gateway. In the preferred embodiment, the selection made by the home gateway is based on a few factors: where the subscriber unit is located (as contained in the connection request), whether the serving gateway is capable of handling the connection request, and whether the call is to be intercepted. There may be other factors known to those of ordinary skill in the art that may be incorporated into selecting the serving gateway.

Each gateway monitors its congestion level to determine whether it is capable of handling the connection request. The gateway status information, which includes the congestion level, is transmitted periodically or upon transitions to the satellites and other gateways in the system. Some gateways may be down or overloaded. Each gateway monitors its congestion level by determining if it wants more or less connection requests. If a gateway exceeds its maximum congestion level, it signals to the satellites and the other gateways that it will be unable to service any more connection requests. Each satellite and gateway receiving this message updates its gateway status information to indicate that the gateway is a poor choice. Conversely, when gateway determines that it can handle more calls, the gateway signals to the satellites and other gateways that it can handle more connection requests. Upon receipt of this message, each satellite and gateway updates its gateway status information to make the gateway more of a preferred choice.

Each home gateway also stores information about whether a particular subscriber unit's call is to be intercepted, and which gateway is to perform the intercept function. If the subscriber unit is to be intercepted, the home gateway assigns a serving gateway that is capable of intercepting the call. In some systems, a subscriber unit may only be intercepted at the home gateway. In such a case, it is important that the home gateway selects itself to service the call. In other systems, a subscriber unit's call may be intercepted at any gateway. In such a situation, any of the visited gateways can be selected to intercept the call.

Once the home gateway selects a visited gateway in step 110 in FIG. 3, the home gateway forwards or routes in step 112 the gateway assignment to the visited gateway. In an alternative embodiment, the home gateway before step 112 may first determine if it selected itself to be the serving gateway. If the home gateway selected itself, method 100 skips steps 112 and 114 and sets up the call between the subscriber unit and satellite (as performed in step 116 and further discussed below). Once the visited gateway receives the gateway assignment in step 112, the visited gateway decides in step 114 whether to accept or reject the connection request. If the visited gateway decides not to accept the call for a reason associated with this gateway (i.e., a reason that would not preclude another gateway from servicing the call), the visited gateway selects in step 118 an alternate visited gateway from an ordered list of preferred alternate visited gateways. This list includes all other possible gateways that can service the call. Once the alternate visited gateway is selected in step 118, the connection request is forwarded to the alternate visited gateway in step 120.

The alternate visited gateway decides in step 122 if it wants to accept or reject the connection request. If the alternate visited gateway accepts the connection request, the alternate visited gateway sets up the call in step 116. Otherwise, the alternative request is rejected and the call is dropped in step 124. Step 124 may include the step of sending a reject message to the subscriber unit that indicates that the connection request is being rejected. In an alternative embodiment, method 100 determines whether the connection request has been forwarded a predetermined number of times. If the connection request was forwarded less than the predetermined number of times, method 100 repeats steps 118, 120 and 122 until it either sets up the call in step 116 or exceeds the predetermined number of times of forwarding the call and eventually rejects the call in step 124.

Call setup as performed in step 116 requires that the visited gateway signal the currently serving satellite with synchronization information so that the subscriber unit and the currently serving satellite can communicate with each other. Call setup procedures are well known to those of ordinary skill in the art. Once the call is setup in step 116 or rejected in step 124, method 100 ends.

It will be appreciated by those skilled in the art that the present invention includes a method where a home gateway selects a serving gateway based on the location of the subscriber unit, whether the call is to be intercepted and whether the serving gateway is capable of servicing the connection request. Thus, it is an advantage of the present invention to assign a specific subscriber unit to a serving gateway for the purpose of intercepting the subscriber traffic. Another advantage of the present invention is that a call is not dropped because the visited gateway initially assigned by the home gateway is unable to service the connection request. Yet another advantage of the present invention is that connection requests are routed around disabled or congested gateways. An additional advantage of the present invention is that connection requests that would have been dropped due to gateway congestion or failure are now served by an alternate gateway. Another advantage is that a subscriber unit can be served by any one of a number of alternate gateways.

Accordingly, it is intended by the appended claims to cover all modifications of the invention which fall within the true spirit and scope of the invention.

What is claimed is:

1. A method for assigning a subscriber unit to a visited gateway, the method comprising the steps of:

a) receiving a connection request;

b) forwarding the connection request to a home gateway and selecting an alternate home gateway if the home gateway is incapable of servicing the connection request;

c) selecting the visited gateway from a list of gateways to service the connection request;

d) forwarding the connection request to the visited gateway; and e) setting-up a call.

2. A method as recited in claim 1, wherein step (a) comprises the steps of:
   a1) a subscriber unit transmitting the connection request to a currently serving satellite; and
   a2) the currently serving satellite receiving the connection request.

3. A method as recited in claim 1, wherein step (b) comprises the steps of:
   b1) the currently serving satellite determining whether the home gateway is capable of servicing the connection request;
   b2) the currently serving satellite selecting an alternate home gateway if the home gateway is incapable of servicing the connection request; and
   b3) the currently serving satellite routing the connection request to the home gateway.

4. A method as recited in claim 1, wherein the subscriber unit sent the connection request for the call, and wherein step (c) comprises the step of selecting the visited gateway from a list of gateways based on at least one of the following: where the subscriber unit is located, whether the visited gateway is capable of servicing the connection request, and whether the call is to be intercepted.

5. A method as recited in claim 1, wherein the subscriber unit sent the connection request for the call, and wherein step (c) comprises the step of selecting the visited gateway from a list of gateways based on if the call is to be intercepted.

6. A method as recited in claim 1, wherein the subscriber unit sent the connection request for the call, and wherein step (c) comprises the step of selecting the visited gateway from a list of gateways based on if the visited gateway is capable of servicing the connection request.

7. A method as recited in claim 1, wherein the subscriber unit sent the connection request for the call, and wherein step (c) comprises the step of selecting the visited gateway from a list of gateways based on if the visited gateway is not overloaded, not down and not reaching maximum capacity.

8. A method as recited in claim 1, wherein step (c) comprises the step of the home gateway selecting the visited gateway to service the connection request.

9. A method as recited in claim 1, wherein the visited and home gateways are part of a network of nodes, step (d) comprises the step of forwarding the connection request through some of the network of nodes.

10. A method as recited in claim 1, wherein step (c) comprises the steps of:
    c1) the home gateway selecting the visited gateway; and
    c2) the home gateway setting-up the call according to the connection request if the home gateway selected itself to be the visited gateway.

11. A method for assigning a subscriber unit to a visited gateway, the method comprising the steps of:
    a) receiving a connection request;
    b) forwarding the connection request to a home gateway;
    c) selecting the visited gateway from a list of gateways to service the connection request;
    d) forwarding the connection request to the visited gateway;
    e) setting-up a call;
    f) determining whether the visited gateway is capable of servicing the connection request;
    g) selecting an alternate visited gateway from a list of alternate visited gateways; and
    h) forwarding the connection request to the alternate visited gateway.

12. A method as recited in claim 11, further comprising the steps of:
    i) determining whether the alternate visited gateway is capable of servicing the connection request;
    j) rejecting the connection request if the alternate visited gateway is incapable of servicing the connection request; and
    k) the alternate visited gateway setting up the call.

13. A method as recited in claim 11, further comprising the steps of:
    i) determining whether the alternate visited gateway is capable of servicing the connection request;
    j) selecting another alternate visited gateway from a list of alternate visited gateways if the alternate visited gateway is incapable of servicing the connection request;
    k) forwarding the connection request to the another alternate visited gateway if the alternate visited gateway is incapable of servicing the connection request;
    l) repeating steps (j) and (k) until an alternate visited gateway is found that can service the connection request or until steps (j) and (k) are repeated a predetermined number of times;
    m) rejecting the connection request if the alternate visited gateway is incapable of servicing the connection request or steps (j) and (k) are repeated the predetermined number of times; and
    n) the alternate visited gateway selected in step (j) setting up the call.

14. A method as recited in claim 11, further comprising the steps of:
    i) determining whether the alternate visited gateway is capable of servicing the connection request;
    j) selecting another alternate visited gateway from a list of alternate visited gateways if the alternate visited gateway is incapable of servicing the connection request;
    k) forwarding the connection request to the another alternate visited gateway if the alternate visited gateway is incapable of servicing the connection request;
    l) rejecting the connection request if the alternate visited gateway is incapable of servicing the connection request; and
    m) the another alternate visited gateway setting up the call.

15. A method for assigning a subscriber unit to a visited gateway, the method comprising the steps of:
    a) receiving a connection request;
    b) forwarding the connection request to a home gateway;
    c) determining whether the home gateway is capable of servicing the connection request;
    d) selecting an alternate home gateway if the home gateway is incapable of servicing the connection request;
    e) forwarding the connection request to the home gateway or the alternate home gateway selected in step (d);
    f) selecting the visited gateway from a list of gateways to service the connection request;
    g) forwarding the connection request to the visited gateway;
    h) determining whether the visited gateway is capable of servicing the connection request;
    i) selecting an alternate visited gateway from a list of alternate visited gateways if the visited gateway is incapable of servicing the connection request;

j) forwarding the connection request to the alternate visited gateway if the visited gateway is incapable of servicing the connection request; and k) setting-up a call.

16. A method as recited in claim 15, wherein the subscriber unit sent the connection request for the call, and wherein step (f) comprises the step of selecting the visited gateway from a list of gateways based on at least one of the following: where the subscriber unit is located, whether the visited gateway is capable of servicing the connection request, and whether the call is to be intercepted.

17. A method as recited in claim 15, wherein the subscriber unit sent the connection request for the call, and wherein step (f) comprises the step of selecting the visited gateway from a list of gateways based on if the call is to be intercepted.

18. A method as recited in claim 15, wherein the subscriber unit sent the connection request for the call, and wherein step (f) comprises the step of selecting the visited gateway from a list of gateways based on if the visited gateway is capable of servicing the connection request.

19. A method as recited in claim 15, wherein the subscriber unit sent the connection request for the call, and wherein step (f) comprises the step of selecting the visited gateway from a list of gateways based on if the visited gateway is not overloaded, not down and not reaching maximum capacity.

20. A method as recited in claim 15, further comprising the steps of:

l) determining whether the visited gateway is capable of servicing the connection request;

m) selecting an alternate visited gateway from a list of alternate visited gateways; and n) forwarding the connection request to the alternate visited gateway.

21. A method as recited in claim 20, further comprising the steps of:

o) determining whether the alternate visited gateway is capable of servicing the connection request;

p) rejecting the connection request if the alternate visited gateway is incapable of servicing the connection request; and q) the alternate visited gateway setting up the call if the connection request is not rejected in step (p).

22. A method as recited in claim 20, further comprising the steps of:

o) determining whether the alternate visited gateway is capable of servicing the connection request;

p) selecting another alternate visited gateway from a list of alternate visited gateways if the alternate visited gateway is incapable of servicing the connection request;

q) forwarding the connection request to the another alternate visited gateway if the alternate visited gateway is incapable of servicing the connection request;

r) repeating steps (p) and (q) until an alternate visited gateway is found that can service the connection request or until steps (p) and (q) are repeated a predetermined number of times;

s) rejecting the connection request if the alternate visited gateway is incapable of servicing the connection request or steps (p) and (q) are repeated the predetermined number of times; and t) the another alternate visited gateway selected in step (p) setting up the call.

23. A method as recited in claim 20, further comprising the steps of:

o) determining whether the alternate visited gateway is capable of servicing the connection request;

p) selecting another alternate visited gateway from a list of alternate visited gateways if the alternate visited gateway is incapable of servicing the connection request;

q) forwarding the connection request to the another alternate visited gateway if the alternate visited gateway is incapable of servicing the connection request;

r) rejecting the connection request if the alternate visited gateway is incapable of servicing the connection request; and s) the another alternate visited gateway setting up the call.

24. A method for assigning a subscriber unit to a visited gateway, the method comprising the steps of:

a) a currently serving satellite receiving a connection request;

b) the currently serving satellite forwarding the connection request to a home gateway;

c) the currently serving satellite determining whether the home gateway is capable of servicing the connection request;

d) the currently serving satellite selecting an alternate home gateway if the home gateway is incapable of servicing the connection request;

e) the currently serving satellite forwarding the connection request to the home gateway or to the alternate home gateway selected in step (d);

f) the home gateway selecting the visited gateway from a list of gateways to service the connection request;

g) the home gateway forwarding the connection request to the visited gateway;

h) the visited gateway determining whether the visited gateway is capable of servicing the connection request;

i) the visited gateway selecting an alternate visited gateway from a list of alternate visited gateways if the visited gateway is incapable of servicing the connection request;

j) the visited gateway forwarding the connection request to the alternate visited gateway if the visited gateway is incapable of servicing the connection request;

k) the visited gateway setting-up a call if the visited gateway is capable of servicing the connection request; and l) the alternate visited gateway setting-up the call if the visited gateway is incapable of servicing the connection request.

* * * * *